United States Patent

[11] 3,588,190

[72] Inventors Yoshiaki Nakano
 Gifu-shi;
 Atutosi Okamoto, Toyohashi-shi; Koichi Taniguchi, Kariya-shi; Koichi Toyama, Toyohashi-shi, Japan
[21] Appl. No. 797,925
[22] Filed Feb. 10, 1969
[45] Patented June 28, 1971
[73] Assignee Nippon Denso Company Limited
 Kariya-shi, Japan
[32] Priority June 29, 1968, July 30, 1968, July 16, 1968
[33] Japan
[31] 43/45291, 43/53738 and 43/50092

[54] OIL HYDRAULIC PRESSURE MODULATING DEVICE FOR USE IN AN ANTI-SKID MEANS OF AUTOMOBILES
4 Claims, 5 Drawing Figs.

[52] U.S. Cl. .................................................. 303/21, 188/181, 303/6, 303/68
[51] Int. Cl. .................................................. B60t 8/12
[50] Field of Search ............................................. 303/21, 6, 61—63, 68—69; 188/181

[56] References Cited
UNITED STATES PATENTS

| 3,093,422 | 6/1963 | Packer et al. | 303/21 |
| 3,264,040 | 8/1966 | Brueder | 303/21 |
| 3,401,986 | 9/1968 | Walker et al. | 303/21 |
| 3,415,578 | 12/1968 | Walker | 303/21 |

Primary Examiner—Milton Buchler
Assistant Examiner—John J. McLaughlin, Jr.
Attorney—Cushman, Darby & Cushman ABSTRACT: Here is disclosed an oil hydraulic pressure modulating device for use in an antiskid means of automobiles equipped with multisystem oil hydraulic braking means, wherein the device is substantially formed of a hydraulic cylinder including therein a series of ports and cooperating piston and valve means constituting a series of tandem units each being adapted to intercept oil hydraulic communication between a master cylinder and a wheel brake cylinder or cylinders and to lower the oil hydraulic pressure in the wheel brake cylinders for the purpose of relaxing the braking action to avoid skidding when the angular deceleration of the wheels has exceeded a safe limit due to abrupt stamping of the brake pedal when the automobile is running on a slippery road.

3,588,190
SHEET 1 OF 2
FIG. 1 PRIOR ART
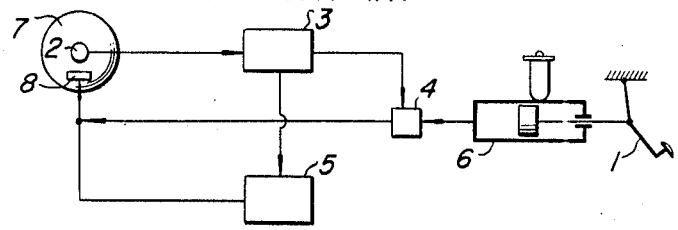
PRIOR ART FIG. 2
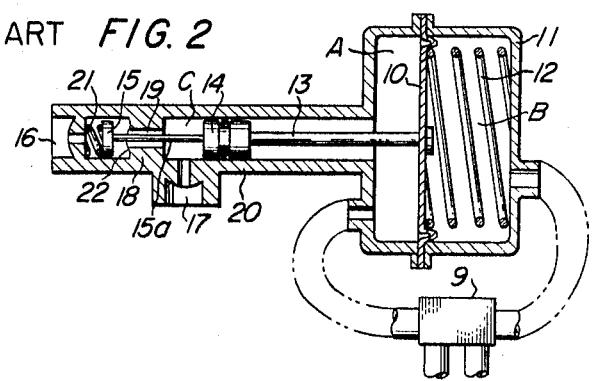
FIG. 3
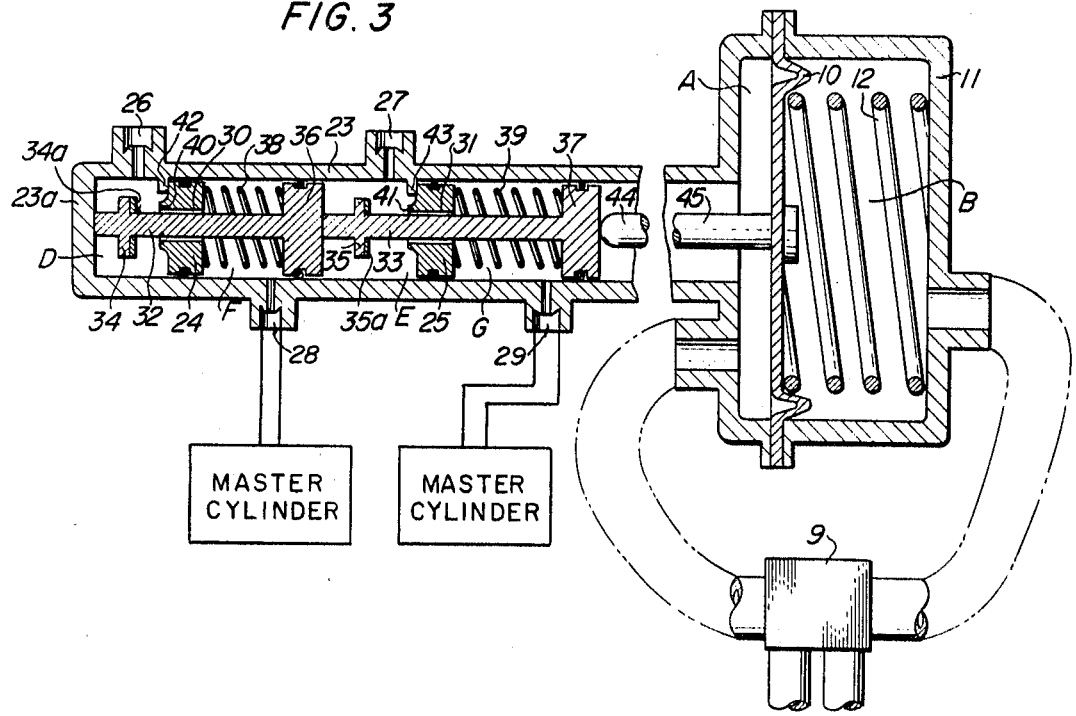
INVENTORS
Yoshiaki Nakano
Atutosi Okamoto
Koichi Taniguchi
Koichi Toyama
By Cushman, Darby & Cushman
ATTORNEYS

OIL HYDRAULIC PRESSURE MODULATING DEVICE FOR USE IN AN ANTI-SKID MEANS OF AUTOMOBILES

BACKGROUND OF THE INVENTION

1. Field of the Invention

The present invention relates to an oil hydraulic pressure modulating device for use in an antiskid means of automobiles having at least two independent systems of oil hydraulic braking.

2. Description of the Prior Art

Oil hydraulic pressure modulating devices for use in antiskid means of automobiles are known. The antiskid means is in principle composed of a device for measuring the angular deceleration of a wheel or wheels of an automobile and an oil hydraulic pressure modulating device for controlling the oil hydraulic pressure applied to a brake cylinder or cylinders of the wheel or wheels in response to the value of the angular deceleration in a manner to forcibly lower the oil hydraulic pressure applied to the brake cylinder regardless of the operation of a master cylinder of the system when the angular deceleration has exceeded a predetermined value, whereby the abrupt stop of rotation of the wheels and the danger of skidding caused thereby can be avoided.

In the following, a conventional antiskid means will be described with reference to FIGS. 1 and 2 of the accompanying drawings. When an automobile is running on a frozen slippery road, stamping of a brake pedal 1 for urgent braking causes a very large angular deceleration of the wheels of the automobile. The angular deceleration is measured by an angular deceleration measuring device 2 and the measured value is transmitted to a controller 3. In the controller 3, the value of the angular deceleration is compared with a predetermined value, and if the former has exceeded the latter, the controller 3 dispatches a signal to a shutoff valve 4 provided in an oil hydraulic line extending from a master cylinder 6 to a wheel cylinder 8 as well as to an oil hydraulic pressure modulating device 5 connected to an oil hydraulic line leading to the wheel cylinder, whereby the valve 4 shuts off instantly the oil hydraulic pressure from the master cylinder 6 and the oil hydraulic pressure modulating device 5 lowers the oil hydraulic pressure in the wheel cylinder 8 so as to loosen the braking force applied to the wheels, whereby steerability and stability of vehicle are maintained.

FIG. 2 shows a conventional oil hydraulic pressure modulating device in which the shutoff valve 4 and the oil hydraulic pressure modulating device 5 in FIG. 1 are incorporated into a unitary device. In this device, a power diaphragm 10 divides the inside space of a power cylinder 11 into chambers A and B, which are fluidly connected to a suction manifold of an engine via a control valve 9. When the automobile is in a normal running condition or not in a highly decelerating condition, the controller 3 delivers no brake relaxing signal, and the control valve 9 fluidly connects the chambers A and B to a negative pressure in the suction manifold of the engine. In this condition, the fluid pressures acting on both sides of the diaphragm 10 are equal to each other, and therefore, the diaphragm 10 is urged leftwards seen in FIG. 2 by the force of a compression spring 12. The power diaphragm 10 is connected via a rod 13 with a hydraulic piston 14 slidably mounted in a hydraulic cylinder 20. The cylinder 20 has a first port 16 hydraulically connected with the master cylinder, a second port 17 hydraulically connected with the wheel cylinder or cylinders 8, and a partition wall 18 which is located between said first and second ports and has a through opening 19 for communicating said first and second ports. Loosely passing through the through opening 19, there is provided a rod 15a which is carrying a valve disc 15 at one end thereof and is abutting against the hydraulic piston 14 at the other end thereof by being urged by a compression spring 21 mounted between the disc 15 and an end wall of the hydraulic cylinder 20. The partition wall 18 is presenting at one side thereof a valve seat 22 adapted to cooperate with the disc 15.

In an operating condition of this oil hydraulic pressure modulating device as shown in FIG. 2, when there is no signal from the controller 3 to actuate the valve 9, and therefore, the chambers A and B are equally exposed to a negative manifold pressure, the power diaphragm 10 is urged leftwards seen in FIG. 2 by the compression spring 12, whereby the hydraulic piston 14 and accordingly the disc 15 are also urged leftwards seen in FIG. 2 under the compression of the spring 21. In this normal condition of the device, the ports 16 and 17 are in communication with each other via the through opening 19, and therefore, the oil hydraulic pressure in the wheel cylinder 8 is fully laid under the control of the operation of the brake pedal 1.

However, if the brake pedal 1 is so promptly stamped when the automobile is running on a slippery road that the angular deceleration of the wheel 8 exceeds a predetermined value, the controller 3 dispatches a brake relaxing signal to the valve 9 which is adapted to thereby release the chamber A to the atmosphere, while keeping the chamber B in communication with the suction manifold of the engine. Now, the pressure difference established on both sides of the power diaphragm 10 urges the piston rightwards seen in FIG. 2 under the compression of the coil spring 12. As the hydraulic piston 14 moves rightwards together with the diaphragm 10, the disc 15 also moves rightwards by being urged by the compression spring 21 until it abuts against the valve seat 22 and closes the through opening 19, whereby the transmission of the hydraulic pressure from the master cylinder to the wheel cylinder is intercepted on one hand, and the hydraulic pressure in the wheel cylinder is lowered due to an enlargement of a space C caused by the retreat of the piston 14 on the other hand. Thus, the braking action applied to the wheels is relaxed and the danger of skidding due to abrupt stop of rotation of the wheels is avoided.

The conventional oil hydraulic modulating device as described in the above is used satisfactorily in a single system of the oil hydraulic braking. However, in recent years, the oil hydraulic brakes of automobiles are in most cases constituted as a multiple system including a master cylinder of tandem type having a plurality of tandem pistons and the corresponding plurality of independent hydraulic systems of the wheel cylinders in order to improve the safety of the automobiles. If such a multiple brake system is employed, the antiskid means must be provided in the respective independent hydraulic systems of the wheel cylinders, and accordingly, there must be provided such number of conventional oil hydraulic pressure-modulating devices as corresponding to the number of the independent hydraulic systems at the sacrifice of a relatively large space consumption and a considerable increase in cost.

On the other hand, as the automobiles become highly efficient and luxurious, the number of accessories such as electrical equipments to be mounted in the automobiles has remarkably increased, and therefore, the economy of mounting space and the simplification of equipments are strongly required.

SUMMARY OF THE INVENTION

Accordingly, the object of the present invention is to provide an oil hydraulic pressure modulating device for use in an antiskid means of automobiles, which is constituted as a unit for use in a multiple oil hydraulic braking system and is nevertheless simple and compact in structure.

The above-mentioned object is attained, according to the present invention, by an oil hydraulic pressure modulating device for use in an antiskid means of automobiles comprising a hydraulic cylinder having a plurality of first ports each being independently hydraulically connected with a cooperating wheel brake cylinder or cylinders and the same plurality of second ports each being independently hydraulically connected with each cooperating port of a master cylinder, said first and second ports being arranged alternately along said hydraulic cylinder to define a series of sets of said first and second ports, the same plurality of valve seat pistons each being slidably mounted in said hydraulic cylinder between said first and second ports of each one of said sets and having a through opening for establishing hydraulic communication between said first and second ports of said one set, the same plurality of solid pistons each being slidably mounted in said hydraulic cylinder in a manner to define a cylinder section including one of said sets of said first and second ports, and the same plurality of valve bodies each being cooperated with said through opening of each one of said valve seat pistons in a manner to normally open said through opening under compression of a compression spring when said solid pistons are urged to their normal positions by the force of a biasing spring but to close said through opening by the force of said compression spring when the force of said biasing spring has disappeared, the force of said biasing spring being transmitted from said biasing spring to said solid pistons via successive abutting contacts therebetween.

BRIEF DESCRIPTION OF THE DRAWINGS

In the accompanying drawings;

FIG. 1 is a diagram of an oil hydraulic braking system incorporating therein an antiskid means of a single hydraulic system;

FIG. 2 to a schematic longitudinal section of a conventional oil hydraulic pressure modulating device applicable to a single hydraulic system of oil hydraulic braking; and FIGS. 3, 4 and 5 are schematic partly broken longitudinal sections of three different embodiments of the oil hydraulic pressure modulating device according to the present invention.

DESCRIPTION OF THE PREFERRED EMBODIMENTS

Figure 4:
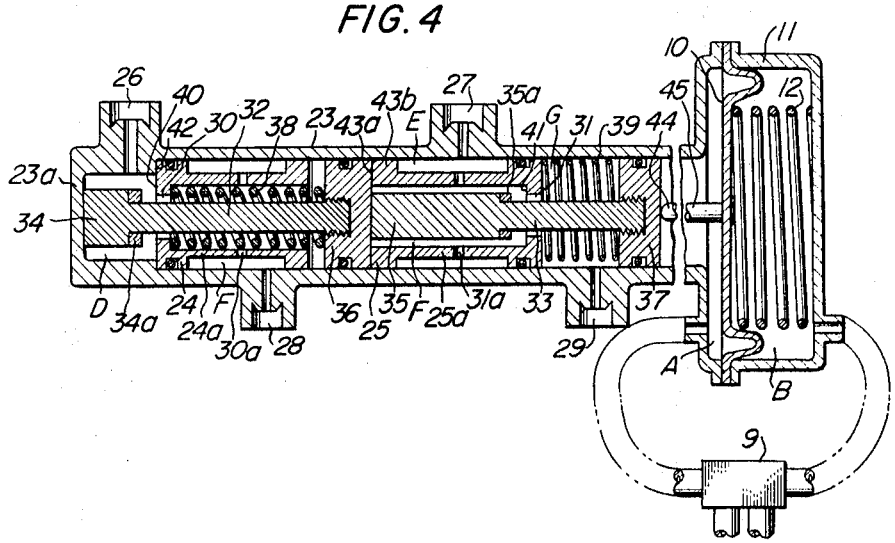

The present invention will now be described with reference to FIGS. 3, 4 and 5 of the accompanying drawings in the form of some preferred embodiments.

Referring first to FIG. 3, the right-hand portion of the device is shown as identical with the corresponding portion of the device shown in FIG. 2, and therefore, is to be understood to operate in the same way as that shown in FIG. 2. In other words, the diaphragm 10 is kept at the normal position urged leftwards as shown in FIG. 3 as long as the angular deceleration of the wheel does not exceed a predetermined value, but is moved rightwards seen in FIG. 3 against the biasing spring 12 if said angular deceleration has exceeded the predetermined value or when the antiskid operation is to be actuated.

The hydraulic portion of the device shown on the left-hand side of FIG. 3 comprises a hydraulic cylinder 23 and the device is substantially housed in this cylinder. The cylinder has a plurality of (or two in this embodiment) first ports 26 and 27 and the same plurality of second ports 28 and 29 alternately arranged therealong. This embodiment is constituted as a unit for use in a two-system oil hydraulic braking means, and therefore, the port 26 is hydraulically connected with the wheel brake cylinders of the front wheels and the port 27 is hydraulically connected with the wheel brake cylinders of the rear wheels. On the other hand, the ports 28 and 29 are respectively hydraulically connected with respective master cylinders of tandem type. The first port 26 and the second port 28 constitute a first set of ports for a first system of hydraulic braking and the first port 27 and the second port 29 constitute a second set of ports for a second system of hydraulic braking.

Slidably fitted in the cylinder 23 and located between said first and second ports of respective sets of ports, there are provided valve seat pistons 24 and 25, which have through openings 30 and 31 and valve seats 40 and 41, respectively. These through openings establish communications between the respective first and second ports.

Also slidably fitted in the cylinder 23, there are provided solid pistons 36 and 37 which are defining respective hydraulic sections each including the first and second ports and the valve seat piston. The solid pistons 36 and 37 are respectively carrying rods 32 and 33 as a unitary member, which are extending axially through the through openings 30 and 31 of the valve seat pistons 24 and 25, respectively, wherein the through opening are each large enough to leave clearance around the penetrating rod required for establishing hydraulic communication between the first and second ports. The end of the rod 32 remote from the solid piston 36 is adapted to abut against a closed end wall 23a of the cylinder 23 and the end of the rod 33 remote from the solid piston 37 is adapted to abut against the adjacent solid piston 36. On the solid piston 37 is abutting an end 44 of a rod 45 of the diaphragm 10.

Adjacent said ends of the rods 32 and 33, the rods are respectively carrying valve bodies 34 and 35 including respectively packing seats 34a and 35a. These valve bodies are adapted to abut against the valve seats 40 and 41, respectively, to intercept the hydraulic communication between said first and second ports by the force of the compression springs 38 and 39, respectively, the force acting to make the solid piston repel the valve seat piston, when the end 44 of the piston rod 45 abutting against the solid piston 37 has retreated.

The valve seat pistons 24 and 25 are limited operates their leftward movement seen in FIG. 3 by stopper means 42 and 43, respectively.

The oil hydraulic modulating device shown in FIG. 3 operates as follows:

As described before, the diaphragm 10 is kept at its leftward position as shown in FIG. 3, as long as there is no necessity of actuating the antiskid means or the angular deceleration of the wheels is kept under a predetermined value. In this condition, the valve bodies 34 and 35 are released from the valve seats 40 and 41, respectively, whereby the master cylinders and the front and rear wheel brake cylinders are in free hydraulic communication via the port 28, the through opening 30 and the port 26 as well as the port 29, the through opening 31 and the port 27, respectively.

However, if the brake pedal was stamped abruptly when the automobile is running on a slippery road, the angular velocity of the wheels is so rapidly lowered that the angular deceleration of the wheels likely exceeds a predetermined valve considered as the safe side limit for avoiding the skidding. As described before, if the angular deceleration of the wheels has exceeded the predetermined valve, the valve 9 is actuated and the diaphragm 10 is moved rightwards seen in FIG. 3, whereby the solid pistons 36 and 37 are also moved rightwards by the pressure of the fluid in chambers D and F as well as by the force of the compression springs 38 and 39 and then the valve bodies 34 and 35 abut against the valve seats 40 and 41 and close the through openings 30 and 31, respectively. Thus, the transmittance of hydraulic pressure from the master cylinder to the wheel brake cylinders is intercepted on one hand. Further, since the valve seat piston 24 and the solid piston 36 as well as the valve seat piston 25 and the solid piston 37 are moved by the pressure in chambers D and E rightwards seen in FIG. 3 as a whole, the volumes of chambers D and E are increased to permit the oil flow from the brake wheel cylinders to the chamber via the ports 26 and 27, respectively. Consequently, the oil hydraulic pressure applied to the wheel brake cylinders is lowered to forcibly loosen the braking action on the other hand. Furthermore, since the distance between the valve seat piston and the solid piston is kept constant determined by the length of the rod 32 or 33, the volumes of chambers F and G are kept constant, and since rod 33 separates from valve 36 as soon as the pressure in chamber E exceeds the pressure in chamber D the oil hydraulic pressure on the side of the master cylinder is kept at such a high pressure that the braking action can instantly be recovered when the signal for loosening the braking action has disappeared. Thus, it will be understood that the oil hydraulic pressure modulating device described in the above compensates the braking action of the operator and modulates the oil hydraulic pressure properly even if he unduly keeps stamping the brake pedal disregarding that a large angular deceleration of the wheels is being caused.

Another embodiment of the oil hydraulic modulating device of this invention shown in FIG. 4 is substantially identical with the embodiment shown in FIG. 3, as the parts in this second embodiment corresponding to those in the first embodiment are designated by the same reference numerals. However, in the second embodiment shown in FIG. 4, the valve seat piston 25 has an elongated cylindrical portion ending at a ring portion 43b which is adapted to abut against an end surface 43a of the adjacent solid piston 36 to be limited of its leftward movement seen in FIG. 4. In this structure, the stopper means 43 as provided in the embodiment shown in FIG. 3 is unnecessary, whereby the manufacture of the cylinder 23 is much facilitated. In the normal condition as shown in FIG. 4, the ports 26 and 28 are hydraulically communicated with each other via openings 30 and 30a and the ports 27 and 29 are hydraulically communicated with each other via openings 31 and 31a. It will be understood that the oil hydraulic pressure modulating device shown in FIG. 4 operates in the substantially same way as that shown in FIG. 3.

Figure 5:
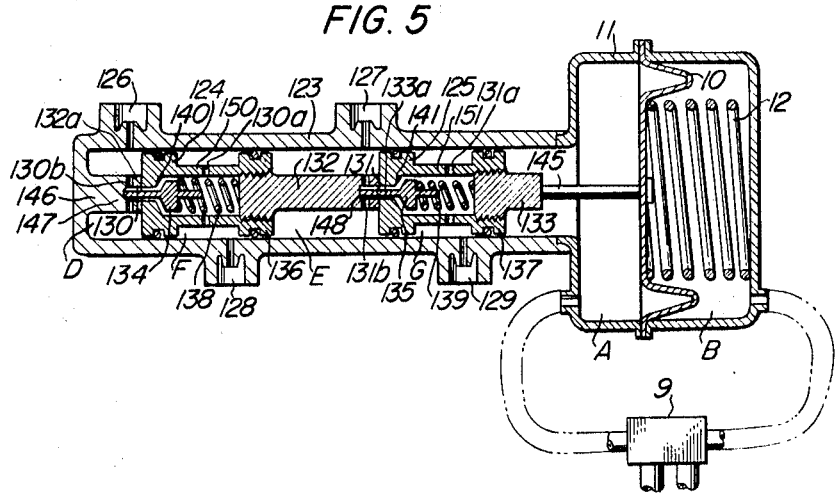

FIG. 5 shows a third embodiment of the oil hydraulic modulating device of this invention. In this embodiment, a hydraulic cylinder 123, which is substantially identical with the cylinder 23 in the first or second embodiment, has also a series of first and second ports 126, 127, 128 and 129 corresponding to the ports 26, 27, 28 and 29 in the former embodiments, respectively. In this embodiment, however, valve seat piston portions 124 and 125 corresponding respectively to the valve seat pistons 24 and 25 in the former embodiments are integrally connected with solid piston portions 136 and 137, respectively, the latter being respectively corresponding to the solid pistons 36 and 37 in the former embodiments, via cylindrical portions 150 and 151, respectively. Furthermore, in the embodiment shown in FIG. 5, valve bodies 134 and 135 corresponding respectively to the valve bodies 34 and 35 in the former embodiments are separated from rods 132 and 133 corresponding to the rods 32 and 33 in the former embodiments, respectively. The valve bodies 134 and 135 have pins 132a and 133a, respectively, which are loosely fitted into through openings 130 and 131 provided at the valve seat piston portions 124 and 125, respectively. Compression springs 138 and 139, which are mounted within the cylindrical portions 150 and 151, respectively, are elastically urging the valve bodies 134 and 135 toward cooperating valve seats 140 and 141 provided at the valve seat piston portions 124 and 125, respectively.

In the normal condition or the condition when there is no necessity of actuating the antiskid means as shown in FIG. 5, a rod 145 corresponding to the rod 45 in the former embodiments is urged leftwardly by the spring 12, whereby the piston portion 124 is abutting against on end projection 146 and the piston portion 125 is abutting against the rod 132, and therefore, the pin 132a of the valve body 134 is abutting against the bottom of an axial hole 147 provided at the end projection 146 of the cylinder 123 so that the valve body 134 is pushed off from the valve seat 140 under compression of the compression spring 138. In the same manner, the pin 133a of the valve body 135 is abutting against the bottom of an axial hole 148 provided at an end of the rod 132 so that the valve body 135 is pushed off from the valve seat 141 under compression of the compression spring 139. In this condition, the ports 126 and 128 are freely hydraulically communicated with each other via through radial openings 130b crossing the axial hole 147, said axial hole and openings 130a provided at the cylindrical portion 150, while the ports 127 and 129 are freely hydraulically communicated with each other via through radial openings 131b crossing the axial hole 148, said axial hole and openings 131a provided at the cylindrical portion 151.

Now, if the angular deceleration of the wheels has exceeded a predetermined value due to abrupt stamping of the brake pedal when the automobile is running on a slippery road, the valve 9 is actuated as described before and a diaphragm 10, which is substantially identical with the piston 10 in FIG. 3, is moved rightwards seen in FIG. 5, whereby the force urging the pins 132a and 133a respectively against the compression springs 138 and 139 disappears and the valve bodies 134 and 135 come into engagement with the valve seats 140 and 141, respectively, by separating the piston portions 124 and 125 from the end projection 146 and the rod 132, respectively, while the piston portions 136 and 137 are moved rightwards seen in FIG. 5 by the reaction of pins 132a and 133a.

By the through openings 130 and 131 thus being closed, the oil hydraulic pressure from the master cylinder is intercepted on one hand, and since the volumes of chambers D and E are increased by the rightward movement of the piston portions 124 and 125, the oil hydraulic pressure applied to the wheel brake cylinders is lowered and thereby the braking action is relaxed on the other hand. Furthermore, since the volumes of chambers F and G are kept constant in spite of the movement of the pistons, the braking action can be instantly recovered when the signal for the actuation of the antiskid means has disappeared.

Although the three embodiments of the present invention described in the above are constituted for use in a two-system oil hydraulic braking means, it will be understood that these embodiments can readily be modified for use in any multisystem oil hydraulic braking means by mere additional repetitions of sets of the first and seconds ports and the cooperating piston and valve means.

We claim:

1. An oil hydraulic pressure modulating device for use in an antiskid means of an automobile having wheels, a plurality of wheel brake cylinders and a plurality of master cylinders, said modulating device comprising:

a movable member having a biasing spring and being kept at a normal position urged by said biasing spring when the angular deceleration of said wheel does not exceed a predetermined value and being actuated to move away against the force of said biasing spring when the said deceleration exceeds said predetermined value;

a rod attached to said movable member;

a hydraulic cylinder having a plurality of first ports each being independently connected hydraulically with at least one of said wheel brake cylinders and a like number of second ports each being independently connected hydraulically with one of said master cylinders, said first and second ports being arranged alternately along said hydraulic cylinder to form a series of sets of first and second ports;

a same plurality of valve seat pistons each being slidably mounted in said hydraulic cylinder between said first and second ports of each one of said sets and having a through opening for establishing hydraulic communication between said first and second ports;

a same plurality of solid pistons each being slidably mounted in said hydraulic cylinder in a manner to define a cylinder section including one of said sets of said first and second ports, one of said solid pistons abutting against an end of said rod and the remaining pistons each abutting against the adjacent solid piston while said movable member is in said normal position;

a same plurality of compression springs being arranged to urge said valve seat pistons to close said through openings; and a same plurality of valve bodies each being cooperated with said through opening of each one of said valve seat pistons in a manner to normally open said through opening while said movable member is kept at said normal position and to close said through opening when said movable member is actuated.

2. An oil hydraulic pressure-modulating device as in claim 1, further including a connecting rod for connecting each one of said solid pistons and each one of said valve bodies as a unitary body, said connecting rod passing through said opening of said valve seat piston, each set of said solid piston and said valve seat piston being biased to push away each other by said compression spring interposed therebetween, and stopper means provided at the wall of said hydraulic cylinder to limit the movement of said valve seat pistons in the direction of the force of said biasing springs.

3. An oil hydraulic pressure-modulating device as in claim 1, further including a cylindrical member connecting each one of said solid pistons and each one of said valve seat pistons as a unitary body, and an end stop provided at the end of said hydraulic cylinder, said valve bodies each being mounted within said cylindrical member, said valve bodies each having a stick element projecting through said opening whereby said valve body is pushed against the biasing force of said compression spring to open said through opening during said movable member is kept at said normal position by abutting said stick against the adjacent solid piston or said end stop in case of the remotest valve body from said biasing spring.

4. An oil pressure-modulating device for use in an antiskid means of an automobile having wheels, means for detecting the angular deceleration of at least one of said wheels, a plurality of wheel brake cylinders, and a plurality of master cylinders comprising:

a hydraulic cylinder having a plurality of first ports, each connected hydraulically with at least one of said wheel brake cylinders and a like number of second ports, each connected hydraulically with at least one of said master cylinders;

a plurality of normally abutting members each movable in said hydraulic cylinder and each closing one end of a first chamber having in it one of said first ports and one of said second ports;

a plurality of valve means each associated with one of said members, each separating one of said first chambers into a second chamber having one of said first ports and a third chamber having one of said second ports with said second chamber normally connected to said third chamber, each movable in said cylinder and each responsive to the movement of the associated member in said hydraulic cylinder in a first direction for closing the hydraulic connection between said second and third chambers; and means for causing said members to move in said first direction upon detection of an angular deceleration above a given value so that the hydraulic connection between said second and third chambers is closed, said valve means moves in said hydraulic cylinder and said abutting members separate to increase the volume of each of said second chambers so as to reduce the hydraulic pressure in said brake cylinders.